(No Model.)
C. W. BAKER.
BOILER.
No. 559,021. Patented Apr. 28, 1896.
Fig. 1.
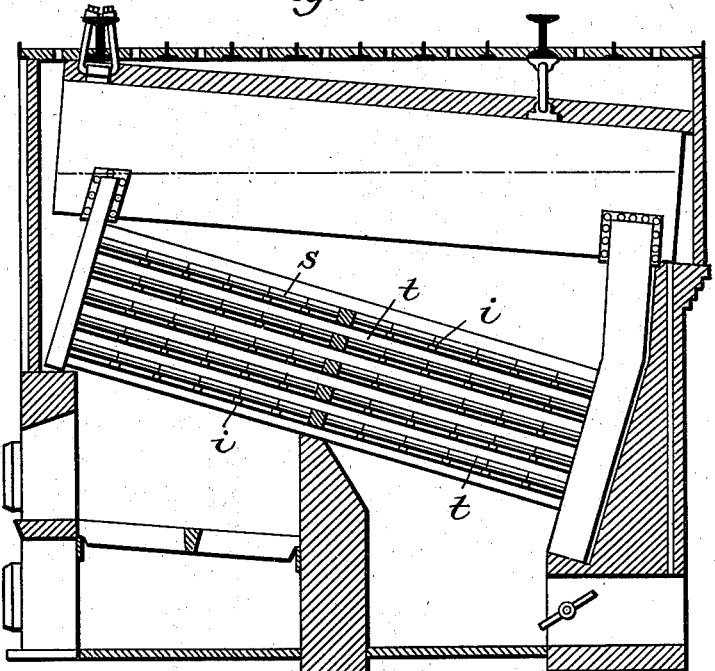
Fig. 2.
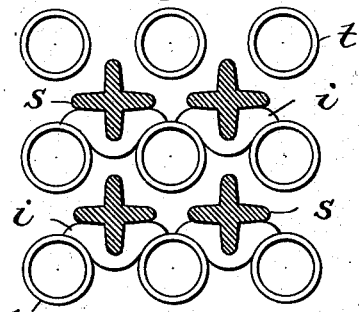
Fig. 3.
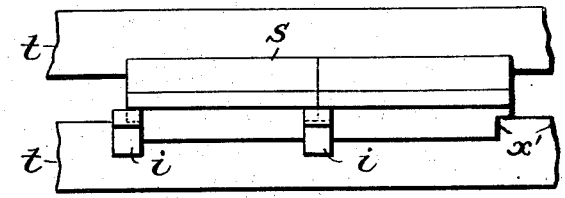
Fig. 4.    Fig. 5.    Fig. 6.
 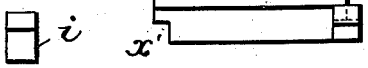
Fig. 9.    Fig. 8.    Fig. 7.
 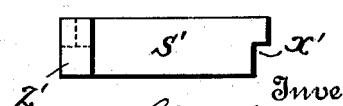
Witnesses                          Inventor
Charles Whiting Baker
by
Attorneys

UNITED STATES PATENT OFFICE.

CHARLES WHITING BAKER, OF MONTCLAIR, NEW JERSEY.

BOILER.

SPECIFICATION forming part of Letters Patent No. 559,021, dated April 28, 1896.

Application filed April 28, 1894. Serial No. 509,394. (No model.)

*To all whom it may concern:*

Be it known that I, CHARLES WHITING BAKER, a citizen of the United States, residing at Montclair, in the county of Essex and State of New Jersey, have invented certain new and useful Improvements in Boilers, of which the following is a specification.

This invention relates to certain new and useful improvements in boilers, and has for its object to deflect the heated gases, cause them to impinge against the boiler-tubes in succession, and cause said tubes to be heated by radiation, as fully set forth hereinafter, and illustrated in the accompanying drawings, wherein—

Figure 1 represents in vertical sectional elevation part of a boiler-furnace, illustrating my improvements. Fig. 2 is an end view, enlarged, of the water-tubes of the boiler and radiators. Fig. 3 is a side view of two of the boiler-tubes, together with one of the radiators and its supporting bridge-pieces. Fig. 4 is a detail view of one form of bridge-piece, and Fig. 5 is a side view thereof. Figs. 6 and 7 are detail side views, enlarged, of a slightly-modified form of radiator; and Fig. 8 is a front view of the form of bridge-piece employed between tubes in the same horizontal row whenever it is desired to leave spaces at the sides of the tubes for access in cleaning. Fig. 9 is a detail view, partly in section, and showing the manner in which the bridge-piece of Fig. 8 supports the radiators between tubes.

The tubes of the boiler in which my improvements are used may be arranged in any desired manner and any required distance apart, and they are held or supported at their ends in any of the ordinary well-known ways. In order that the tubes may be most effectually heated and to cause impingement of the gases against all of the tubes, as well as to cause the heat to be radiated and deflected, I employ between the tubes, and preferably lengthwise thereof, suitable radiating and deflecting bodies S, which may be of any suitable refractory material, but which I preferably form of terra-cotta, fire-brick, or other similar substance. As shown in Figs. 2 and 3 of the drawings, these radiators S are laid in rows and are disposed on each pair of the tubes, they being held or supported in such position or relation to the tubes by bridge-pieces $i$, which span the spaces between the tubes and rest on adjacent tubes and are placed at joints between the radiators. These radiators S have each four radiating-flanges, as shown, and the bridge-pieces $i$ span the space between the tubes $t$ and are placed at joints between the radiators. These bridge-pieces may be of any desired design, but they are of less width at their lower ends than at their upper ends, said lower ends being narrow enough to be inserted between the tubes, while the upper ends are wider than the spaces between the tubes. The side edges of the bridge-pieces are preferably formed concave and are adapted to conform to the contour of the tubes upon which they bear.

The ends of the radiators S are formed with projections $x'$, adapted to fit into recesses $x$, which extend from the upper edge of the bridge-pieces $i$. These recesses are so arranged that the radiators are held centrally of the spaces between the tubes $t$ out of contact therewith and no lateral movement of the radiators is permitted.

In the modifications illustrated in Figs. 7 to 9 the radiators consist of flat plates S′, which are arranged vertically between the tubes. The bridge-pieces $z'$ illustrated in these modifications are slightly different in design, but otherwise they are the same in construction as the bridge-plates $i$.

Without limiting myself to the exact construction and arrangement of the parts shown and described, what I claim is—

1. In a water-tube boiler, the combination with the tubes of said boiler, of refractory radiating-bodies supported centrally in the passages between the tubes but out of contact with said tubes in position to avoid interfering with the flow of hot gases over the surfaces of said tubes, substantially as described.

2. In a water-tube boiler, the combination with the tubes of said boiler, of radiating and deflecting bodies, and bridge-pieces spanning the spaces between the tubes and supporting said radiating and deflecting bodies, said bridge-pieces having their side edges formed to conform to the contour of the boiler-tubes, substantially as described.

3. In a water-tube boiler, the combination with the tubes of said boiler, of bridge-pieces spanning the spaces between the tubes, the lower ends of said bridge-pieces being narrower than their upper ends, and radiating and deflecting bodies supported upon said bridge-pieces, substantially as described.

4. In a water-tube boiler, the combination with the tubes of said boiler, of recessed bridge-pieces spanning the spaces between the tubes, and radiating and deflecting bodies engaging the recesses of the bridge-pieces, substantially as described.

5. In a water-tube boiler, the combination with the tubes of said boiler, of recessed bridge-pieces spanning the spaces between the tubes, and radiating-bodies provided with projections adapted to be received into the recesses of the bridge-pieces, substantially as described.

6. In a water-tube boiler, the combination with the tubes of said boiler, of radiating-bodies of refractory material arranged in the spaces between the tubes out of contact therewith, and bridge-pieces spanning the spaces between the tubes for supporting the radiating-bodies, substantially as described.

7. In a water-tube boiler, the combination with the tubes of said boiler, of radiating and deflecting bodies each having four radiating-flanges, substantially as described.

In testimony whereof I have signed my name to this specification in the presence of two subscribing witnesses.

CHARLES WHITING BAKER.

Witnesses:
M. N. BAKER,
A. B. GILBERT.